United States Patent [19]
Barry

[11] 3,759,405
[45] Sept. 18, 1973

[54] METHOD AND APPARATUS FOR LOADING TRUCKS

[76] Inventor: Robert J. Barry, 462 Arlington Dr., Pasadena, Calif. 91105

[22] Filed: July 7, 1971

[21] Appl. No.: 160,275

[52] U.S. Cl. ............ 214/38 D, 104/172 B, 214/152
[51] Int. Cl. ............................................. B65g 67/02
[58] Field of Search ............ 214/11 R, 38 B, 38 BA, 214/38 BB, 38 D, 152, 515, 516, 517; 104/172 R, 172 B

[56] References Cited
UNITED STATES PATENTS

| | | | |
|---|---|---|---|
| 2,636,622 | 4/1953 | Saxe | 214/11 R |
| 2,742,863 | 4/1956 | Burkitt | 104/172 B |
| 3,434,604 | 3/1969 | Haldimann et al. | 214/38 BA X |
| 2,096,958 | 10/1937 | Clerc | 214/38 D X |
| 3,253,126 | 5/1966 | Baughman | 246/2 S X |

*Primary Examiner*—Robert C. Sheridan
*Attorney*—White, Haefliger and Bachand

[57] ABSTRACT

The processing of various goods for distribution to multiple stores includes the steps:

a. supplying the various goods at different stations spaced along a loading way at a distribution location;

b. advancing a series of side-loading carriers in sequence along said way, each such carrier associated with at least one of said stores;

c. selectively side loading onto each carrier, as it advances past said stations, the particular goods required by the carrier associated store; and d. advancing each such carrier to its associated store after completion of said side loading at said distribution station.

7 Claims, 4 Drawing Figures

PATENTED SEP 18 1973 3,759,405
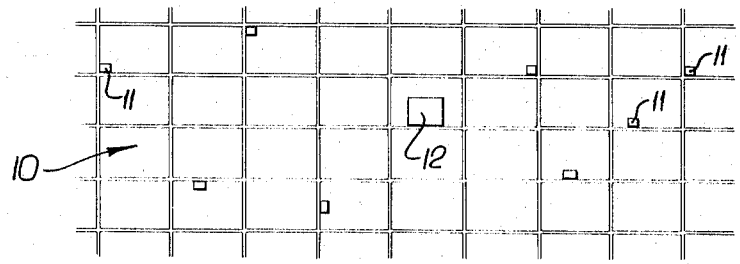
Fig. 1.
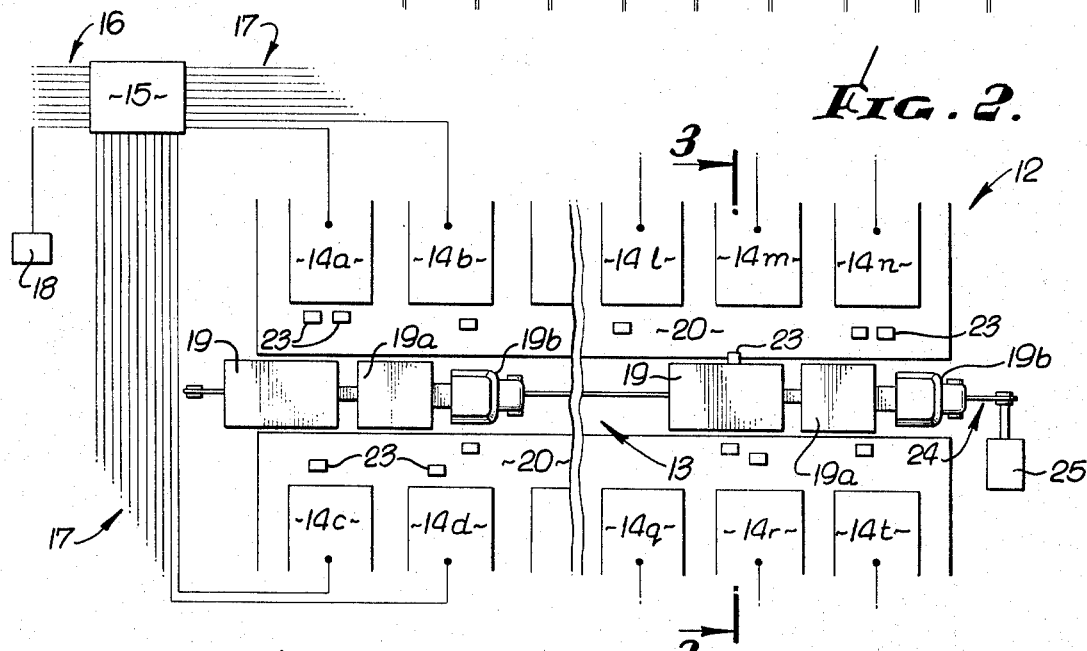
Fig. 2.
Fig. 3.
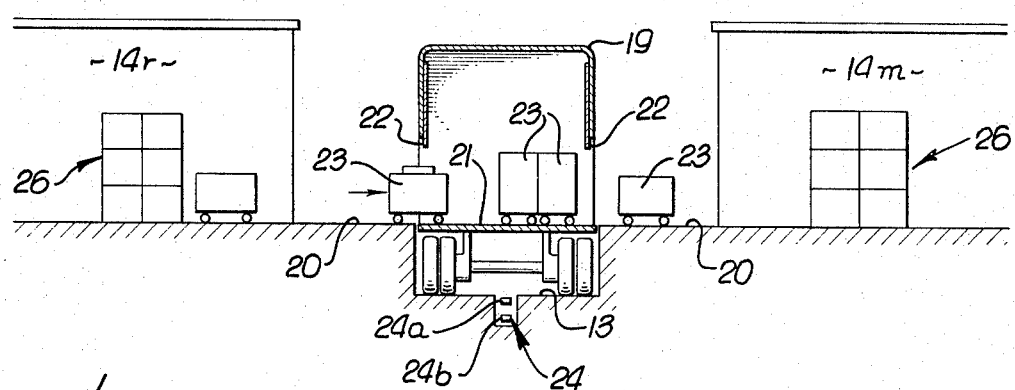
Fig. 4.
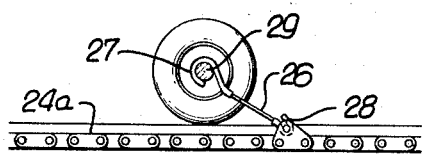
INVENTOR.
ROBERT J. BARRY
BY
White, Haefliger & Bachand
ATTORNEYS.

METHOD AND APPARATUS FOR LOADING TRUCKS

BACKGROUND OF THE INVENTION

This invention relates generally to distribution of goods from a central source to a number of stores or other depots, and more particularly concerns efficient use of vehicles in loading and transporting goods (such as produce, for example) between the source and multiple stores having different inventory requirements.

At the present time, perishable commodities such as produce are distributed to many stores in a typical large urban area from a central market or distribution source located in that area and surrounded by the outlying stores. The latter may, for example, be organized in chains, with fleets of trucks which converge on the central source in the early morning to load and then deliver the commodity requirements to the various stores. A typical truck or trailer is slowly backed up to a loading dock, stopped, and hand loaded with crates or other containers of various items in quantities needed by the store or stores to which the truck delivers. This requires time consuming gathering and carrying of the goods from many different display areas to the loading dock in question, and such procedure is seen to become extremely complex, time consuming and costly when hundreds of trucks are involved. Also, upon delivery, hand unloading of the trucks at the destination stores is time consuming and expensive.

SUMMARY OF THE INVENTION

It is a major object of the invention to provide system and method characterized as greatly simplifying the necessary motorized carrier loading and delivery requirements, and substantially reducing the loading complexities referred to. Basically, and in its method aspects, the invention contemplates the following steps:

a. supplying the various goods at different stations spaced along a loading way at a distribution location, b. advancing a series of side-loading carriers in sequence along said way, each such carrier associated with at least one of said stores, c. selectively side loading onto each carrier, as it advances past said stations, the particular goods required by the carrier associated store, and d. advancing each such carrier to its associated store after completeion of said side loading at said distribution station.

As will be seen, the side loading may typically be effected by transporting selected goods from the stations onto the carriers on sub-carriers (as for example carts) retained on the principal carriers or trucks during subsequent advancement of the latter to the destination stores. In this regard, the trucks may be slowly pulled along the way, as by an endless conveyor. At such stores the sub-carriers may be unloaded for subsequent return to the central distribution location and selective reloading at the different stations.

These and other objects and advantages of the invention, as well as the details of an illustrative embodiment, will be more fully understood from the following description and drawings, in which:

DRAWING DESCRIPTION

FIG. 1 is a plan view;

FIG. 2 is a plan view;

FIG. 3 is an elevation, taken in section on line 3—3 of FIG. 2; and

FIG. 4 is a fragmentary elevation.

DETAILED DESCRIPTION

Referring to FIG. 1, an urban area 10 may for example include multiple retail stores, as for example food markets 11 spread over many square miles. Such stores will have varying need for goods, as for example fresh produce items, on different days. Normally, such needs will be met by delivery trucks which congregate daily at a central distribution location 12 to receive and load selected goods, as required by the particular store or stores serviced by the trucks.

The system shown in FIGS. 2 and 3 is well adapted to speed the loading of carriers such as delivery trucks, in accordance with the needs of the various stores. An elongated loading way 13 is provided at the central distribution location 12, and a series of supply stations 14 is located along way 13, the various goods or produce being stocked at the stations. For example, apples, oranges and lettuce might be located at stations 14a, 14b and 14c respectively, other such stations designated at 14d — 14t.

Means may be provided to transmit to the stations 14 information indicative of the particular goods requirements of the stores 11. For example, a central computer 15 receives and stores such information telephoned from the various stores, as indicated at 16. The computer also receives information as to which trucks are to be traveled along the way 13, and approximately when, as for example by a truck scanner 18 reading identifying data on the side of a truck trailer 19 entering the way 13. The computer processes this information, and informs the stations, as via paths 17, concerning the loading requirements of specific identified trucks or carriers, and the approximate timing of truck travel past the stations.

The way 13 may be sunk downwardly relative to loading docks 20 at a lower level characterized in that the beds 21 of the trucks or trailers 19 and 19a are at approximately the levels of the docks. Also, the units 19 and 19a are of side-loading construction, i.e., have side doors as indicated at 22 which may be opened so that goods may quickly be moved laterally onto the beds 21 as the trucks slowly move along the way 13, and sequentially. Further, the goods may be so moved from the stations 14a – 14t onto the truck beds in sub-carriers such as small carts 23, the latter being clustered in the trucks for transportation to the stores. More specifically, the carts may be pre-filled at the stations with precisely the quantities of goods needed by the stores, for rapid lateral loading onto the slowly moving trucks. Stacks of produce are indicated at 26 in FIG. 3.

The trucks typically include tractor units 19b, which may be advanced along the way 13 as by an endless conveyor 24 having upper and lower stretches 24a and 24b, as seen in FIG. 3. A drive for the conveyor appears at 25 in FIG. 2. The connection between the upper conveyor stretch 24a and the tractor may be releasable, as indicated in FIG. 4, wherein, for example, a short cable length 26 releasably hooks onto the tractor front axle 29 at 27 and onto a lug 28 on the upper cable stretch 24a. Other releasable drives between the endless conveyor and trucks may be provided, as for example pusher structure engaging a vehicle wheel.

When each truck has completed its travel through or along the way 13, the connection or drive is released, and the truck is free to be driven to its associated store or depot for rapid unloading of the carts 23. Empty carts may then be returned to the central distribution location 12 for re-filling at the stations 14a – 14t in accordance with instructions furnished by computer 15 or other means.

In the above, it will be understood that various goods, other than produce, may be distributed in accordance with the disclosed principles. Also, all types of side-loading trucks, trailers, and tractor-trailer units may be processed as described. Of advantage is the fact that trailers may be side-loaded while remaining attached to tractors, eliminating the time and expense of connection and disconnection of tractor-trailer units.

I claim:

1. In the processing of various goods for distribution to multiple remote stores, the steps that include:
   a. supplying multiple of the various goods at each of different storage stations spaced along a loading way at a distribution location;
   b. operating pulling apparatus to releasably pull an otherwise unconnected series of side-loading motor truck type carriers in sequence along said way, each such carrier associated with at least one os said stores;
   c. variably filling selected goods onto sub-carriers at said stations and in accordance with the varied requirements of stores to which the carriers are to be driven, and selectively side loading onto each carrier, as it advances past said stations the variably filled sub-carriers to be delivered to the store to which that carrier is to be driven;
   d. releasing the carriers in sequence from the pulling apparatus and driving each such carrier to its associated store after completion of said side loadIng at said distribution stations, and
   e. unloading the variably filled sub-carriers off the carriers at said stores, and returning unloaded sub-carriers to the distribution location for selective reloading thereof at said stations.

2. The process of claim 1 wherein said goods consist of perishable produce.

3. The process of claim 1 including transmitting to said stations information indicative of the goods requirements of the stores to be loaded on the carriers to be dispatched to said stores, and also indicative of the timing of carrier travel past the stations, and using said information to control the variable filling of the sub-carriers and said side loading.

4. In a system of processing various goods for distribution to multiple stores via associated motor truck type carriers, the combination comprising:
   a. a loading way and a series of goods storage stations spaced along said way, at a distribution location, the various goods located at corresponding stations, and said carriers spaced along said way,
   b. endless conveyor type pulling apparatus releasably attached to the carriers for advancing said carriers in sequence along said way so as to be subject to selective side loading thereon of the particular goods required by the carrier associated store, and proximate said stations, the carriers having side doors and being unconnected other than by said apparatus, and
   c. wheeled sub-carriers at said stations receiving said different goods loaded thereon and moving onto the carriers, certain of the loaded sub-carriers remaining on the carriers for rapid removal of the sub-carriers and goods off the carriers at said stores, the goods loaded on the sub-carriers corresponding to the varied requirements of the stores to which the carriers are to be driven.

5. The system of claim 4 including elevated loading docks extending alongside said way at opposite sides thereof at a level proximate the levels of the truck beds, said stations located adjacent said docks the separation of said docks widthwise of the way approximating the widths of the truck beds.

6. The system of claim 4 wherein said carrier pulling apparatus is releasably attached to carrier support meechanism and extends along said way and beneath the carriers.

7. The system of claim 4 including means to transmit to said stations information indicative of the goods requirements of the stores to be loaded on the carriers to be dispatched to said stores and also indicative of the timing of carrier travel past the stations, said last named means including a scanner located in such proximity to the loading way as to scan the sequence of carriers subject to travel along the way.

* * * * *